(12) United States Patent
Shi

(10) Patent No.: US 10,931,953 B2
(45) Date of Patent: Feb. 23, 2021

(54) VIDEO CODING PROCESSING METHOD, DEVICE AND APPLICATION WITH VIDEO CODING FUNCTION

(71) Applicant: Tencent Technology (Shenzhen) Company Limited, Shenzhen (CN)

(72) Inventor: Yongfang Shi, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/670,842

(22) Filed: Oct. 31, 2019

(65) Prior Publication Data

US 2020/0068201 A1 Feb. 27, 2020

Related U.S. Application Data

(63) Continuation of application No. PCT/CN2018/110816, filed on Oct. 18, 2018.

(30) Foreign Application Priority Data

Dec. 19, 2017 (CN) .......................... 201711371988.2

(51) Int. Cl.
*H04N 19/147* (2014.01)
*H04N 19/119* (2014.01)
(Continued)

(52) U.S. Cl.
CPC ......... *H04N 19/147* (2014.11); *H04N 19/119* (2014.11); *H04N 19/15* (2014.11); *H04N 19/154* (2014.11)

(58) Field of Classification Search
CPC ................................................. H04L 65/607
See application file for complete search history.

(56) References Cited

U.S. PATENT DOCUMENTS

2013/0034151 A1 2/2013 Zhou et al.
2013/0083843 A1* 4/2013 Bennett ............... H04N 19/156
375/240.02
(Continued)

FOREIGN PATENT DOCUMENTS

CN 104159113 A 11/2014
CN 106161991 A 11/2016
(Continued)

OTHER PUBLICATIONS

Tencent Technology, ISR, PCT/CN2018/110816, Dec. 29, 2018, 3 pgs.

(Continued)

*Primary Examiner* — Clifford Hilaire
(74) *Attorney, Agent, or Firm* — Morgan, Lewis & Bockius LLP

(57) ABSTRACT

This application relates to a video coding processing method performed at a computing device, and an application having a video coding function. The method includes: obtaining a coding state parameter and load information of a terminal in a current processing cycle, and a first coding parameter of a first coder used in the current processing cycle; determining a second coding parameter according to the coding state parameter and the load information of the terminal; and in accordance with a determination that the second coding parameter and the first coding parameter are different, adjusting the first coder according to the second coding parameter and/or configuring a second coder according to the second coding parameter, to code frame data in a next processing cycle.

18 Claims, 6 Drawing Sheets

(51) Int. Cl.
*H04N 19/15* (2014.01)
*H04N 19/154* (2014.01)

(56) References Cited

U.S. PATENT DOCUMENTS

| | | |
|---|---|---|
| 2014/0161172 A1 | 6/2014 | Wang et al. |
| 2015/0172676 A1 | 6/2015 | Gao et al. |
| 2017/0026445 A1 | 1/2017 | Soroushian et al. |

FOREIGN PATENT DOCUMENTS

| | | |
|---|---|---|
| CN | 106331717 A | 1/2017 |
| CN | 106454413 A | 2/2017 |
| CN | 106993190 A | 7/2017 |
| WO | WO 2017141001 A1 | 8/2017 |

OTHER PUBLICATIONS

Tencent Technology, WO, PCT/CN2018/110816, Dec. 29, 2018, 4 pgs.

Tencent Technology, IPRP, PCT/CN2018/110816, Jun. 23, 2020, 5 pgs.

\* cited by examiner

US 10,931,953 B2

VIDEO CODING PROCESSING METHOD, DEVICE AND APPLICATION WITH VIDEO CODING FUNCTION

CROSS-REFERENCE TO RELATED APPLICATION

This application is a continuation application of PCT/CN2018/110816, entitled "VIDEO CODING PROCESSING METHOD AND APPARATUS, AND APPLICATION HAVING VIDEO CODING FUNCTION" filed on Oct. 18, 2018, which claims priority to Chinese Patent Application No. 201711371988.2, entitled "VIDEO CODING PROCESSING METHOD AND APPARATUS, AND APPLICATION HAVING VIDEO CODING FUNCTION" filed with the China National Intellectual Property Administration on Dec. 19, 2017, both of which are incorporated by reference in their entirety.

FIELD OF THE TECHNOLOGY

This application relates to the field of computer technologies, and in particular, to a video coding processing method and apparatus, and an application having a video coding function.

BACKGROUND OF THE DISCLOSURE

With improvement of bandwidth and development of the mobile Internet, people have increasingly higher pursuits for high resolution and super high resolution video experience. To reduce a code rate of a video with continuously improved resolution to a level that may be carried by a network, compression coding needs to be performed on the video.

SUMMARY

Embodiments of this application provide a video coding processing method, applied to a computing device. The method includes: obtaining a coding state parameter and load information in a current processing cycle, and a first coding parameter of a first coder used in the current processing cycle; determining a second coding parameter according to the coding state parameter and the load information; and in accordance with a determination that the second coding parameter and the first coding parameter are different, adjusting the first coder according to the second coding parameter, and/or configuring a second coder according to the second coding parameter, to code frame data in a next processing cycle, the second coder and the first coder belonging to different types of coders.

The embodiments of this application provide a computing device comprising one or more processors, memory coupled to the one or more processors and a plurality of programs stored in the memory that, when executed by the one or more processors, cause the client to perform the aforementioned video coding processing method.

The embodiments of this application provide a non-transitory computer readable storage medium storing a plurality of machine readable instructions in connection with a client having one or more processors. The plurality of machine readable instructions, when executed by the one or more processors, cause the client to perform the aforementioned video coding processing method.

It needs to be understood that the above general descriptions and the following detailed descriptions are merely for exemplary and explanatory purposes, and cannot limit this application.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

Specific embodiments of this application have been shown through the foregoing accompanying drawings, and will be described in detail below. These accompanying drawings and text descriptions are not for limiting the idea of this application in any manner, but for describing the concept of this application for a person skilled in the art with reference to the specific embodiments.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

In some embodiments, because a high resolution video has high coding complexity, when a software solution is used to perform video coding, central processing unit (CPU) utilization is relatively high, power consumption is large, electricity consumption is fast, and coding real-time performance is limited by the coding complexity and cannot meet a real-time coding requirement of the high resolution video. When a hardware solution is used to perform video coding, CPU utilization is low and power consumption is small, but customizability is not strong, video characteristics suitable for network transmission cannot be selected flexibly, and an anti-packet loss capability is poor. The embodiments of this application provide a video coding processing method.

The video coding processing method provided in the embodiments of this application may be applied to scenarios in which video coding needs to be performed, including but not limited to application scenarios such as a video call, a video conference, live video streaming, live game streaming, and video surveillance. The foregoing application scenarios may be shown in FIG. 1A: A user uses a terminal 101 to perform a video call, a video conference, live video streaming, live game streaming, and the like.

Figure 1A:
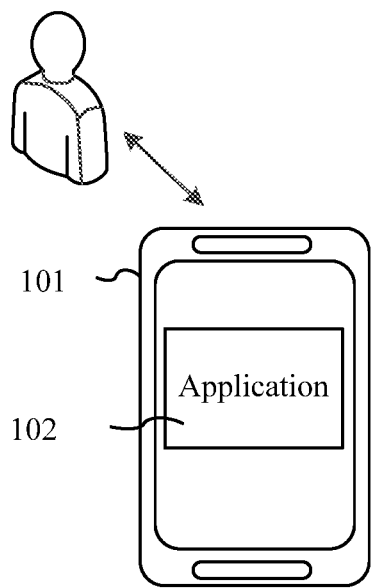
FIG. 1A is a schematic diagram of a system architecture involved in the embodiments of this application.

In some embodiments, the video coding processing method provided in the embodiments of this application is applied to an application having a video coding function, such as QQ, WeChat, Now Live, or another application. as 102 shown in FIG. 1A. After a coding state parameter and load information of a terminal in a current processing cycle, and a first coding parameter of a first coder used in the current processing cycle are obtained, a second coding parameter may be determined according to the coding state parameter and the load information of the terminal, so that in accordance with a determination that the second coding parameter and the first coding parameter are different, the first coder is adjusted according to the second coding parameter, or a second coder is configured according to the second coding parameter, to code frame data in a next processing cycle, the second coder and the first coder belonging to different types of coders. Therefore, the coding parameters and the coders are adjusted according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

Figure 1B:
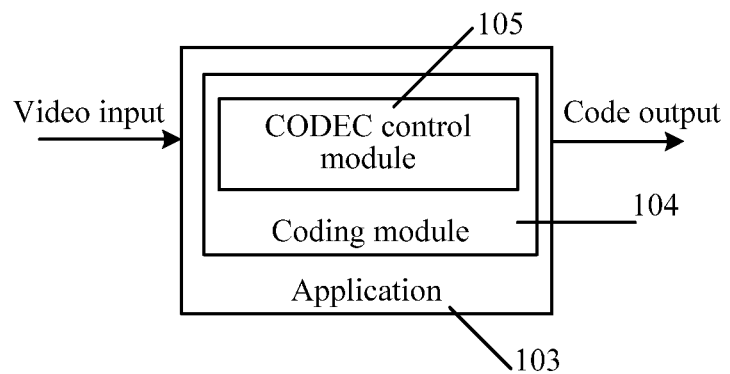
FIG. 1B is a schematic diagram of a system architecture involved in the embodiments of this application.

In some embodiments, the application scenarios of the embodiments of this application may further be shown in FIG. 1B. That is, an application 103 includes a coding module 104, where the coding module 104 includes a COder-DECoder (CODEC) control module 105. The CODEC is a program or device that supports video and audio compression (CO) and decompression (DEC), may compress and code an original video signal into a binary data file in a specific format, and can decode the data file. After the application 103 receives a video input, the CODEC control module 105 adjusts a coding parameter of a coder or selects a suitable coder according to a network state and load information, to code video data, to obtain coded output data.

The following describes a video coding processing method and apparatus, and an application having a video coding function provided in this application in detail with reference to the accompanying drawings.

First, the video coding processing method provided in this application is described in detail, and that the method is applied to the application having a video coding function is used as an example for description.

Figure 1C:
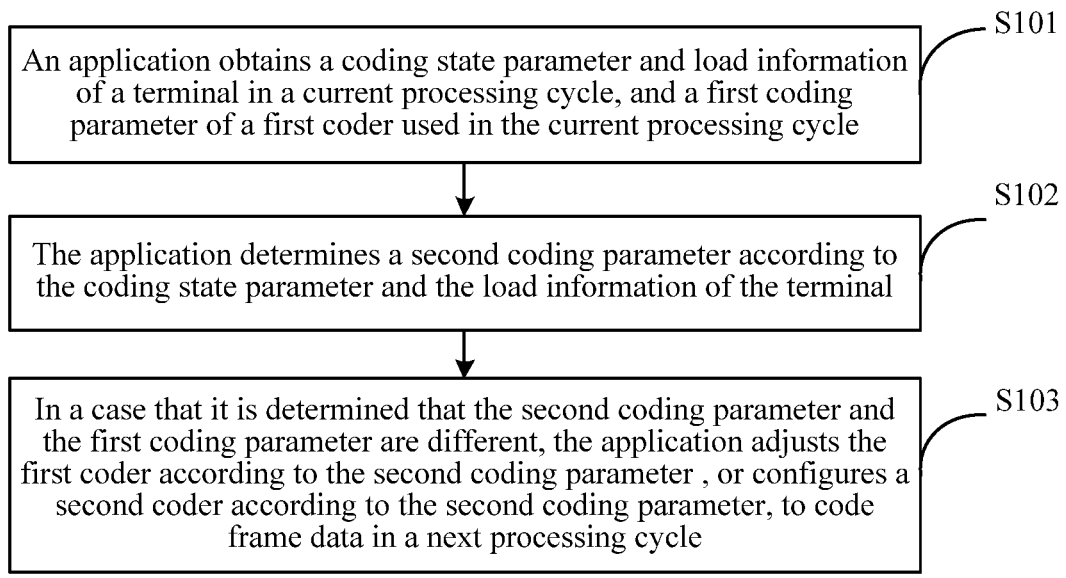
FIG. 1C is a schematic flowchart of a video coding processing method shown according to an exemplary embodiment of this application.

FIG. 1C is a schematic flowchart of a video coding processing method shown according to an exemplary embodiment of this application.

As shown in FIG. 1C, the video coding processing method includes the following steps:

Step S101. An application obtains a coding state parameter and load information of a terminal in a current processing cycle, and a first coding parameter of a first coder used in the current processing cycle.

Specifically, the video coding processing method provided in the embodiments of this application may be performed by an application having a video coding function, to code a video. The application is disposed in a terminal, and types of the terminal may be plural, for example, may be a mobile phone and a computer.

The processing cycle refers to a coding processing cycle preset according to a need. Duration of the processing cycle may be set according to an amount of frame data, for example, one piece of frame data corresponds to one processing cycle; or may be set according to a time, for example, a is or 2$s$ time corresponds to one processing cycle, which is not limited in this application.

The first coding parameter may include a code rate, a resolution, and/or a frame rate of the first coder. The code rate is also referred to as a bit rate, and may be a size of data coded per second by a coder, and the unit is kbps. For example, 800 kbps represents that 800 kb data is generated per second by the coder. The frame rate may be frames per second (FPS). The resolution may be pixels included in per inch.

The first coder may be a hardware coder or a software coder.

The coding state parameter may include an average packet loss rate, an average peak signal to noise ratio (PSNR), an average transmission code rate, and an average network bandwidth.

The load information may include a remaining endurance and an average CPU utilization of a terminal.

The average CPU utilization refers to a utilization of a load in a CPU in the current processing cycle.

Step S102. The application determines a second coding parameter according to the coding state parameter and the load information of the terminal.

The second coding parameter includes a code rate, a resolution, and/or a frame rate of a coder.

Specifically, a correspondence between the coding state parameter and the load information of the terminal and the coding parameters may be preset, so that after obtaining the coding state parameter and the load information of the terminal in the current processing cycle, the application may determine, according to the preset correspondence, the second coding parameter corresponding to the coding state parameter and the load information of the terminal.

For example, it is assumed that an average network packet loss rate (AvgLoss), an average CPU utilization (AvgCPU), an average coding efficiency (AvgEfficiency) (obtained through calculation according to the AvgPSNR and the AvgBr), and an average network bandwidth (BW) are all divided in advance into three levels: small, general, and large sequentially, the remaining endurance T of the terminal is divided in advance into three levels: short, general, and long sequentially, and the resolution in the coding parameters is divided in advance into three levels: low, medium, and high sequentially.

Assuming that a coding parameter of a current processing cycle of the terminal is: a resolution level is i (low), after the current processing cycle ends, it is determined that a coding state parameter of the current processing cycle is: the network AvgLoss is small, and the network BW is sufficient. That is, when the lowest bandwidth requirement of an (i+1)

resolution level is reached, the resolution level may be raised to (i+1), to determine that the resolution in the second coding parameter is: the (i+1) level resolution. If the (i+1) level resolution corresponds to the medium resolution or the high resolution, the coder may try to switch to the hardware coder to perform coding of the next processing cycle.

When the coding state parameter of the current processing cycle is: the network AvgLoss is relatively large, or the BW is reduced to be lower than the lowest bandwidth requirement of the i level, the resolution level may be lowered to (i−1), to determine that the resolution in the second coding parameter is: an (i−1) level resolution. If the (i−1) level resolution corresponds to the low resolution level, a software coding manner may be used to perform coding of the next processing cycle.

In the embodiments of this application, the correspondence between the coding state parameter and the load information of the terminal and the coding parameters may be set according to the following principles.

Principle 1

Figure 1D:
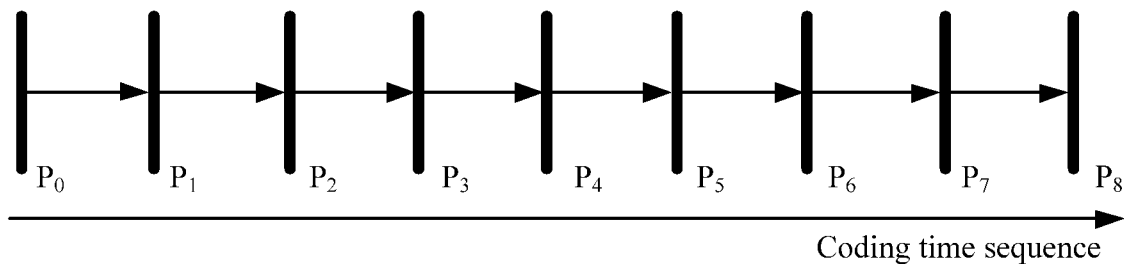
FIG. 1D is a schematic diagram of an IPPP reference structure shown according to an exemplary embodiment of this application.
Figure 1E:
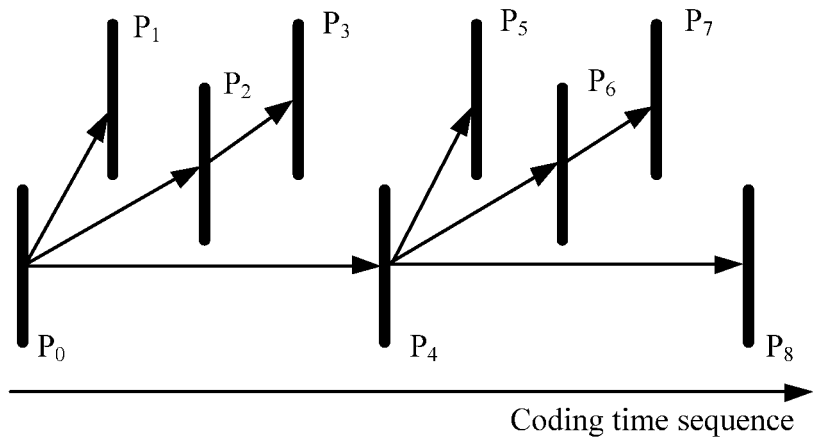
FIG. 1E is a schematic diagram of an HPP reference structure shown according to an exemplary embodiment of this application.

The hardware coder can only configure an IPPP reference structure shown in FIG. 1D, where "I" (Intra-Prediction) represents an I frame, and the I frame is an intra-predictive frame, which does not rely on other frames during decoding, is a randomly accessed entry point, and is also a reference frame for decoding. "P" represents a P frame (Predictive-Frame), the P frame is a forward predictive frame, and the P frame is sequentially referenced to an adjacent previous frame. FIG. 1D only shows the P frame, and $P_i$ represents a frame image at a moment i. The software coder may configure a hierarchical P-frame prediction (HPP) reference structure shown in FIG. 1E. FIG. 1E only shows the P frame, and $P_i$ represents a frame image at a moment i. Using the software coder to perform video coding can reduce impact of a sudden packet loss. Therefore, when the network packet loss rate of the terminal is large, the software coder may be used to perform video coding as much as possible, so that when the network packet loss rate of the terminal is large, the coding parameters corresponding to the coding state parameter and the load information of the terminal may be set according to the coding parameters suitable for the software coder.

For example, assuming that the coding parameters suitable for the software coder are the low resolution level and the low code rate level, when the network packet loss rate of the terminal is large, the corresponding coding parameters may be set to the coding parameters suitable for the software coder, namely, the low resolution level and the low code rate level.

Principle 2

The hardware coder does not occupy CPU resources, and electricity of the terminal may be better saved. Therefore, when the average CPU utilization of the load of the terminal is relatively large, it may be preferentially considered to use the hardware coder to perform video coding, so that when the average CPU utilization of the load of the terminal is relatively large, the coding parameters corresponding to the coding state parameter and the load information of the terminal may be set according to the coding parameters corresponding to the hardware coder.

For example, if the network AvgLoss in the current processing cycle is relatively large, or the BW is reduced to the lowest bandwidth requirement of the i level, it may be determined that the resolution level needs to be lowered to (i−1). The (i−1) level resolution corresponds to the low resolution level, namely, the software coding manner may be used to perform coding of the next processing cycle.

However, in this case, that the AvgCPU utilization of the load of the terminal is high or the current remaining endurance T is short is determined according to the load information of the terminal. In this case, if the coder switches to the software coder, the AvgCPU utilization of the load of the terminal is higher. Therefore, the hardware coder needs to be preferentially used.

Further, after the coder switches to the hardware coder, if it is found that the average coding efficiency is reduced by over 20%, the coder needs to switch back to the software coder.

In some embodiments, after the coder switches back to the software coder, the coder may further be prohibited from being switched to the hardware coder again, to prevent the average coding efficiency from being continuously reduced.

As can be learned through the foregoing analysis, after the application determines the coding state parameter and the load information of the terminal, while the second coding parameter is determined according to the coding state parameter and the load information of the terminal, whether the coder corresponding to the second coding parameter is the software coder or the hardware coder is determined.

Step S103. In a case that it is determined that the second coding parameter and the first coding parameter are different, the application adjusts the first coder according to the second coding parameter, or configures a second coder according to the second coding parameter, to code frame data in a next processing cycle.

The second coder and the first coder belong to different types of coders, and the second coder may also be a hardware coder or a software coder.

In the embodiments of this application, the first coder may be a software coder, and the second coder may be a hardware coder, or the first coder may be a hardware coder, and the second coder is a software coder, which is not limited herein.

The hardware coder may be a hardware coder module in a hardware chip, such as an H.264 hardware coder module in a Qualcomm's chip and an Apple's A10 chip. The software coder may be a segment of code included in the application itself, and the like.

Specifically, during adjustment of the first coder, a code rate, a resolution, and/or a frame rate of the first coder may be adjusted. During configuration of the second coder, a code rate, a resolution, and/or a frame rate of the second coder may be configured.

It may be understood that, coding parameter ranges to which different coders may be applied may be the same or may overlap. Therefore, after determining the second coding parameter, the application may adjust the first coder according to the second coding parameter, to use the adjusted first coder to code the frame data in the next processing cycle, or may configure the second coder according to the second coding parameter, to use the second coder to code the frame data in the next processing cycle.

In the embodiments of this application, when determining that the second coding parameter and the first coding parameter are different, the application may determine, according to the load information of the terminal in the current processing cycle, whether to adjust the first coder or configure the second coder, to code the frame data in the next processing cycle.

Specifically, if it is determined, according to the load information of the terminal in the current processing cycle, that a type of a target coder used in the next processing cycle and a type of the first coder used in the current processing cycle are the same, the first coder may be adjusted according to the second coding parameter; and if it is determined, that the type of the target coder used in the next processing cycle and the type of the first coder used in the current processing cycle are different, the second coder may be configured according to the second coding parameter.

Correspondingly, before the configuring a second coder according to the second coding parameter in step S103, the method may further include:

determining, according to the load information of the terminal in the current processing cycle, that a type of a target coder and a type of the first coder used in the current processing cycle are different.

For example, it is assumed that an average network packet loss rate (AvgLoss), an average CPU utilization (AvgCPU), an average coding efficiency (AvgEfficiency) (obtained through calculation according to the AvgPSNR and the AvgBr) and an average network bandwidth (BW) are all divided in advance into three levels: small, general, and large sequentially, the remaining endurance T of the terminal is divided in advance into three levels: short, general, and long sequentially, and the resolution in the coding parameters is divided in advance into three levels: low, medium, and high sequentially.

During specific use, if the terminal uses the software coder in the current processing cycle, the corresponding coding parameter is: the resolution level is i (low). After the current processing cycle ends, it is determined that a coding state parameter of the current processing cycle is: the network AvgLoss is small, and the network BW is sufficient. That is, when the lowest bandwidth requirement of an (i+1) resolution level is reached, the resolution level may be raised to (i+1), that is, the resolution in the coding parameter determined according to the foregoing coding state parameter is: the (i+1) level resolution. Further, if the AvgCPU in the current processing cycle is high, the type of the coder used in the next processing cycle may be determined as the hardware coder, so that the hardware coder may be configured according to the (i+1) level resolution, and the coder further tries to switch to the hardware coder to perform coding of the next processing cycle.

If the AvgCPU in the current processing cycle is low, because the average coding efficiency of the software coder is high, after the software coder is adjusted according to the (i+1) level resolution, the software coder may continue to be used to perform coding of the next processing cycle.

During specific implementation, when adjusting the first coder or configuring the second coder according to the second coding parameter, the application may adjust or configure the coding in different manners according to the types of coders.

Specifically, if the coder is a hardware coder, the application may transmit the second coding parameter to the hardware coder through an interface of the hardware coder, so that the hardware coder configures its coding circuit according to the second coding parameter. If the coder is a software coder (code carried by itself), the application may determine parameters of an invoking function according to the second coding parameter when invoking the software coder, to adjust or configure the software coder.

In the embodiments of this application, when the hardware coder is used to code the frame data in the next processing cycle, the application may transmit the frame data in the next processing cycle to the hardware coder through the interface of the hardware coder, and then the hardware coder codes the frame data in the next processing cycle. After the coding is completed, the hardware coder transmits a coded bit stream to the application through the interface, so that the application may transmit the received bit stream to applications of other terminals.

When the software coder is used to code the frame data in the next processing cycle, the application may directly invoke the code carried by itself (namely, the software coder), to code the frame data in the next processing cycle, and after the coding is completed, may transmit a coded bit stream to applications of other terminals.

In the video coding processing method provided in the embodiments of this application, after obtaining a coding state parameter and load information of a terminal in a current processing cycle, and a first coding parameter of a first coder used in the current processing cycle, an application may determine a second coding parameter according to the coding state parameter and the load information of the terminal, so that in accordance with a determination that the second coding parameter and the first coding parameter are different, the first coder is adjusted according to the second coding parameter, or a second coder is configured according to the second coding parameter, to code frame data in a next processing cycle. The coding parameters and the coders are adjusted according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

Figure 2:
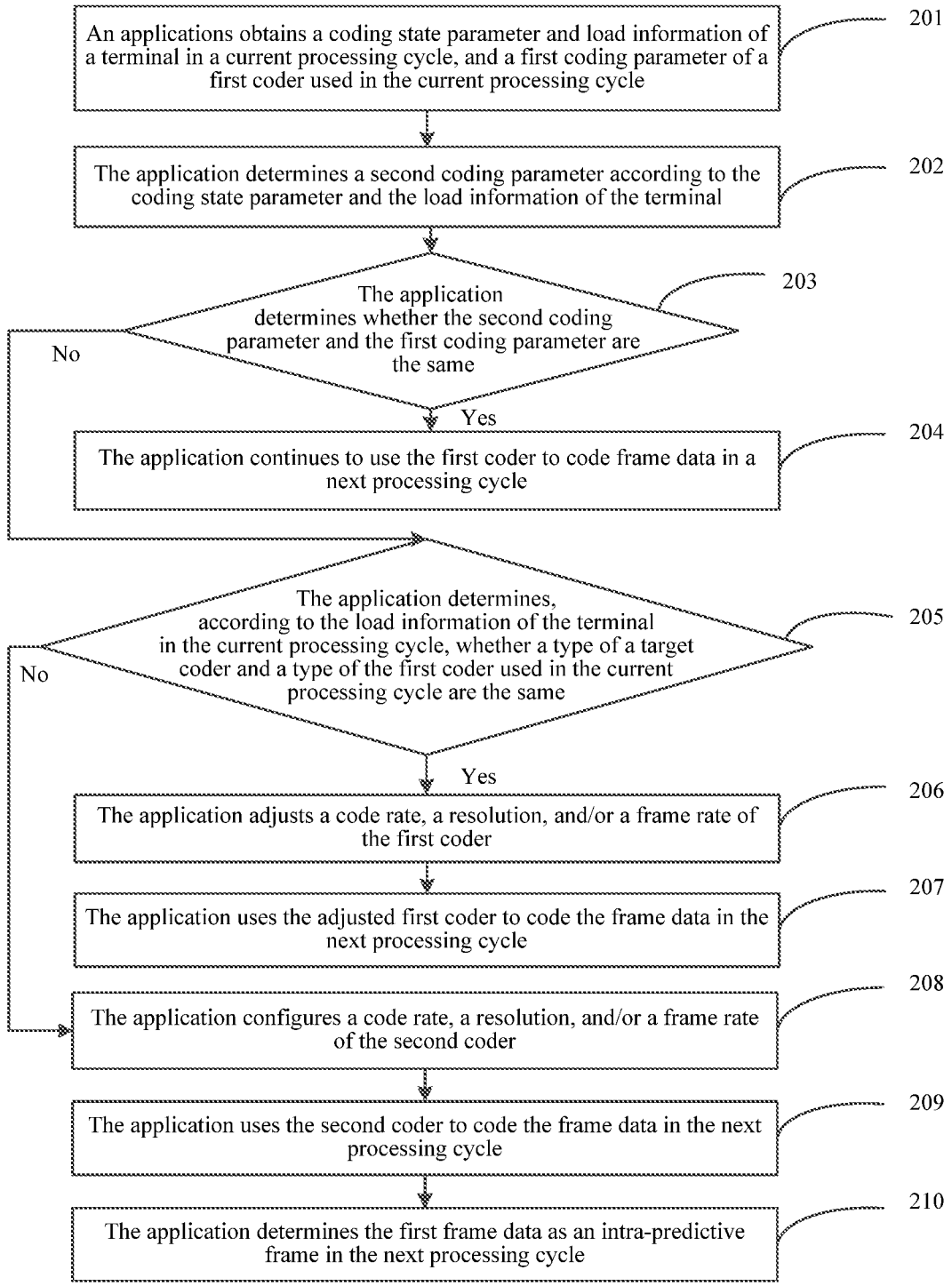
FIG. 2 is a schematic flowchart of a video coding processing method shown according to an exemplary embodiment of this application.

The following further describes the video coding processing method provided in this application with reference to FIG. 2.

FIG. 2 is a schematic flowchart of a video coding processing method shown according to another exemplary embodiment of this application.

As shown in FIG. 2, the video coding processing method includes the following steps:

Step 201. An application obtains a coding state parameter and load information of a terminal in a current processing cycle, and a first coding parameter of a first coder used in the current processing cycle.

Step 202. The application determines a second coding parameter according to the coding state parameter and the load information of the terminal.

The second coding parameter includes a code rate, a resolution, and/or a frame rate of a coder.

Specifically, for specific implementation processes and principles of step 201 to step 202, reference may be made to specific descriptions of step 101 to step 102 in the foregoing embodiments. Details are not described herein again.

Step 203. The application determines whether the second coding parameter and the first coding parameter are the same, if yes, performs step 204; and otherwise, performs step 205.

Step 204. The application continues to use the first coder to code frame data in a next processing cycle.

Specifically, after determining the second coding parameter according to the coding state parameter and the load information of the terminal, the application may compare the second coding parameter with the first coding parameter of the first coder used in the current processing cycle. If the second coding parameter and the first coding parameter are the same, the first coder may be not adjusted, and the first coder continues to be used to code the frame data in the next processing cycle.

During specific implementation, if the first coder is a hardware coder, the application may continue to transmit the frame data in the next processing cycle to the first coder through an interface of the first coder, for the first coder to code the frame data in the next processing cycle. After the coding of the first coder is completed, the application receives a bit stream coded by the first coder through the interface, so that the application may transmit the received bit stream to applications of other terminals.

If the first coder is a software coder, the application may continue to use the code carried by itself (namely, the first coder), to code the frame data in the next processing cycle, and after the coding is completed, may transmit a coded bit stream to applications of other terminals.

Step 205. The application determines, according to the load information of the terminal in the current processing cycle, whether a type of a target coder and a type of the first coder used in the current processing cycle are the same, if yes, performs step 206, and otherwise, performs step 208.

Step 206. The application adjusts a code rate, a resolution, and/or a frame rate of the first coder.

Step 207. The application uses the adjusted first coder to code the frame data in the next processing cycle.

It may be understood that, coding parameter ranges to which different coders may be applied may be the same or may overlap. Therefore, after determining the second coding parameter, the application may adjust the first coder according to the second coding parameter, to use the adjusted first coder to code the frame data in the next processing cycle, or may configure the second coder according to the second coding parameter, to use the second coder to code the frame data in the next processing cycle.

In the embodiments of this application, when determining that the second coding parameter and the first coding parameter are different, the application may determine, according to the load information of the terminal in the current processing cycle, whether the type of the target coder and the type of the first coder used in the current processing cycle are the same, to determine whether to adjust the first coder or configure the second coder, to code the frame data in the next processing cycle.

Specifically, if determining, according to the load information of the terminal in the current processing cycle, that the type of the target coder and the type of the first coder used in the current processing cycle are the same, the application may adjust the code rate, the resolution, and/or the frame rate of the first coder, and then use the adjusted first coder to code the frame data in the next processing cycle.

During specific implementation, if the first coder is a hardware coder, the application may adjust the code rate, the resolution, and/or the frame rate of the first coder, then transmit the frame data in the next processing cycle to the first coder through the interface of the first coder, and after the coding of the first coder is completed, and receive a bit stream coded by the first coder through the interface, so that the application may transmit the received bit stream to applications of other terminals.

If the first coder is a software coder, the application may invoke the first coder (namely, invoke the code carried by itself) according to the second coding parameter, to code the frame data in the next processing cycle, and after the coding is completed, may transmit a coded bit stream to applications of other terminals.

Step 208. The application configures a code rate, a resolution, and/or a frame rate of the second coder.

The second coder and the first coder belong to different types of coders.

Step 209. The application uses the second coder to code the frame data in the next processing cycle.

The specific implementation processes and principles of the foregoing embodiments are also applicable to this embodiment of this application. Details are not described herein again.

Specifically, if determining, according to the load information of the terminal in the current processing cycle, that the type of the target coder and the type of the first coder used in the current processing cycle are different, the application may configure the code rate, the resolution, and/or the frame rate of the second coder, and then use the configured second coder to code the frame data in the next processing cycle.

Specifically, if the second coder is a hardware coder, the application may transmit the frame data in the next processing cycle to the second coder through the interface of the second coder, and after the coding of the second coder is completed, receive a bit stream coded by the second coder through the interface, so that the application may transmit the received bit stream to applications of other terminals.

If the second coder is a software coder, the application may invoke the code carried by itself (namely, the second coder) according to the second coding parameter, to code the frame data in the next processing cycle, and after the coding is completed, may transmit a coded bit stream to applications of other terminals.

Step 210. The application determines the first frame data as an intra-predictive frame in the next processing cycle.

Specifically, if the configured second coder is used to code the frame data in the next processing cycle, because the coder changes, the application needs to determine the first frame data in the next processing cycle as an intra-predictive frame, namely, an I frame, so that other frame data in the next processing cycle may use the first frame data to perform video coding.

In the video coding processing method provided in the embodiments of this application, after obtaining a coding state parameter and load information of a terminal in a current processing cycle, and a first coding parameter of a first coder used in the current processing cycle, an application may determine a second coding parameter according to the coding state parameter and the load information of the terminal. If the second coding parameter and the first coding parameter are the same, the application continues to use the first coder to code frame data in a next processing cycle. If the second coding parameter and the first coding parameter are different, and the first coder is determined to be adjusted, the application adjusts a code rate, a resolution, and/or a frame rate of the first coder, and uses the adjusted first coder to code the frame data in the next processing cycle. If the second coding parameter and the first coding parameter are different, and a second coder is determined to be configured, the application configures a code rate, a resolution, and/or a frame rate of the second coder, and uses the second coder to code the frame data in the next processing cycle. Finally, the application determines the first frame data in the next processing cycle as an intra-predictive frame. Therefore, the coding parameters and the coders are adjusted according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

As can be learned through the foregoing analysis, after obtaining the coding state parameter and the load information of the terminal in the current processing cycle, and the first coding parameter of the first coder used in the current processing cycle, the application may determine the second coding parameter according to the coding state parameter and the load information of the terminal, so that when it is determined that the second coding parameter and the first coding parameter are different, the first coder is adjusted according to the second coding parameter, or the second coder is configured according to the second coding parameter, to code the frame data in the next processing cycle. During actual application, when the configured second coder is used to code the frame data in the next processing cycle, a coding effect may be not as good as that of the first coder used in the previous processing cycle. The following describes the foregoing situation in detail with reference to FIG. 3.

Figure 3:
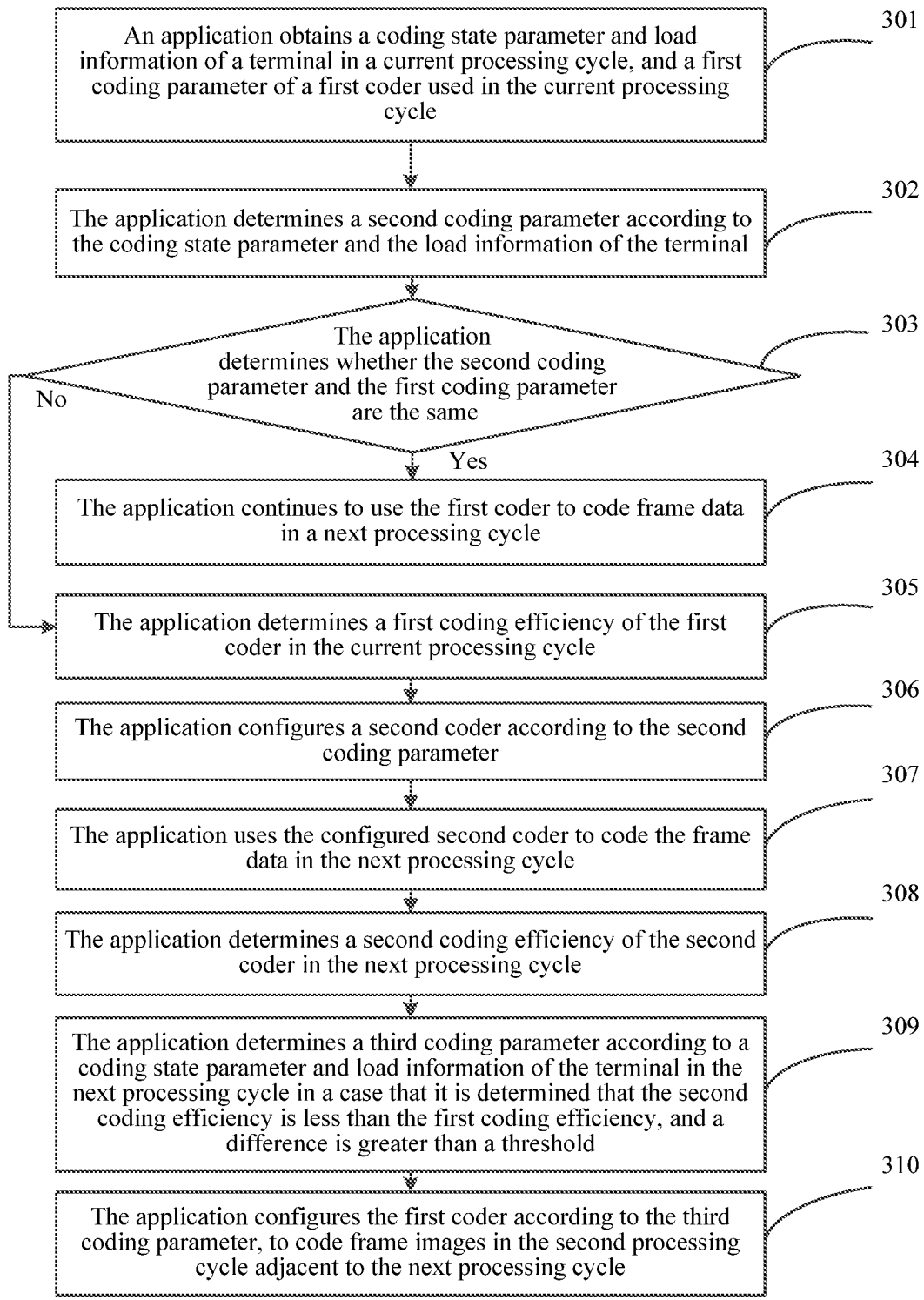
FIG. 3 is a schematic flowchart of a video coding processing method shown according to an exemplary embodiment of this application.

FIG. 3 is a schematic flowchart of a video coding processing method shown according to another exemplary embodiment.

As shown in FIG. 3, the video coding processing method may include the following steps:

Step 301. An application obtains a coding state parameter and load information of a terminal in a current processing cycle, and a first coding parameter of a first coder used in the current processing cycle.

Step 302. The application determines a second coding parameter according to the coding state parameter and the load information of the terminal.

Step 303. The application determines whether the second coding parameter and the first coding parameter are the same, if yes, performs step 304, and otherwise, performs step 305.

Step 304. The application continues to use the first coder to code frame data in a next processing cycle.

For specific implementation processes and principles of step 301 to step 304, reference may be made to specific descriptions in the foregoing embodiments. Details are not described herein again.

Step 305. The application determines a first coding efficiency of the first coder in the current processing cycle.

Specifically, the first coding efficiency may be determined according to an average PSNR and an average code rate of the first coder in the current processing cycle. Usually, when the average PSNR is fixed, a larger average code rate indicates a lower coding efficiency.

Step 306. The application configures a second coder according to the second coding parameter.

The second coder and the first coder belong to different types of coders.

Step 307. The application uses the configured second coder to code the frame data in the next processing cycle.

For specific implementation processes and principles of step 306 to step 307, reference may be made to specific descriptions in the foregoing embodiments. Details are not described herein again.

The correspondence between the coding state parameter and the load information of the terminal and the coding parameters may further be set according to the following principle.

Principle 3

The software coder and the hardware coder may have different coding efficiencies, the consistency of the coding efficiency of the software coder is relatively good, and the discreteness of the coding efficiency of the hardware coder is relatively large. Therefore, when the coding efficiency of the currently used hardware coder is excessively low, the software coder may be preferentially used to perform video coding, so that when the coding efficiency of the currently used hardware coder is excessively low, the coding parameters corresponding to the coding state parameter and the load information of the terminal may be set according to the coding parameters corresponding to the software coder.

For example, assuming that the coding parameters corresponding to the software coder is the low resolution level and the low code rate level, when the coding efficiency of the currently used hardware coder is excessively low, the corresponding coding parameters may be set to the coding parameters corresponding to the software coder, that is, the low resolution level and the low code rate level, so that the coder may switch to the software coder to perform video coding.

Step 308. The application determines a second coding efficiency of the second coder in the next processing cycle.

Specifically, the second coding efficiency may be determined according to an average PSNR and an average code rate of the second coder in the next processing cycle. Usually, when the average PSNR is fixed, a larger average code rate indicates a lower coding efficiency.

Step 309. The application determines a third coding parameter according to a coding state parameter and load information of the terminal in the next processing cycle in accordance with a determination that the second coding efficiency is less than the first coding efficiency, and a difference is greater than a threshold.

Step 310. The application configures the first coder according to the third coding parameter, to code frame images in the second processing cycle adjacent to the next processing cycle.

The threshold may be set according to needs, for example, may be set to 20% and 30% of the first coding efficiency.

Specifically, if the second coding efficiency is less than the first coding efficiency, and the difference is greater than the threshold, it represents that when the configured second coder is used to code the frame data in the next processing cycle, a coding effect is not as good as that of the first coder used in the previous processing cycle. Therefore, in the embodiments of this application, the application may switch back to the original first coder, to code frame data in the second processing cycle adjacent to the next processing cycle.

When the application switches back to the original first coder, the coding state parameter and the load information of the terminal in the next processing cycle may have changed compared with the coding state parameter and the load information of the terminal in the current processing cycle. Therefore, when the first coder is used to code the frame data in the second processing cycle adjacent to the next processing cycle, the coding parameters of the first coder further need to be re-configured.

Specifically, the third coding parameter may be determined according to the coding state parameter and the load information of the terminal in the next processing cycle, to configure the first coder according to the third coding parameter, to code the frame images in the second processing cycle adjacent to the next processing cycle. The specific method for determining the third coding parameter is the same as the method for determining the first coding parameter or the second coding parameter, and is not described herein again.

In addition, if the second coding efficiency is greater than or equal to the first coding efficiency, or the second coding efficiency is less than the first coding efficiency, and the difference is less than or equal to the threshold, it represents that when the configured second coder is used to code the frame data in the next processing cycle, the coding effect is better than that of the first coder used in the previous processing cycle. In the embodiments of this application, the application may continue to determine the third coding parameter in the second processing cycle adjacent to the next processing cycle according to the coding state parameter and the load information of the terminal in the next processing cycle, and configure the second coder according to the third coding parameter, to code the frame images in the second processing cycle adjacent to the next processing cycle.

Further, when the second coding efficiency is less than the first coding efficiency, and the difference is greater than the threshold, after the application configures the first coder according to the third coding parameter, if the coding state parameter and the load information of the terminal are unchanged, compared with that the second coder is used to code the frame data in the second processing cycle adjacent to the next processing cycle, continuing to use the original first coder to code the frame data in the second processing cycle adjacent to the next processing cycle has a better coding effect. Therefore, in the embodiments of this application, if the coding state parameter and the load information of the terminal are unchanged, the application may preferentially use the first coder to code the frame data in the second processing cycle adjacent to the next processing cycle.

That is, after the configuring the first coder according to the third coding parameter in step 310, the method may further include:

When the coding state parameter and the load information of the terminal are unchanged, the application determines that a priority of the first coder is higher than that of the second coder.

In the embodiments of this application, that the coding state parameter and the load information of the terminal are unchanged is an ideal situation. During actual application, when the coding state parameter and the load information of the terminal are changed in a preset range, it may be determined that the priority of the first coder is higher than that of the second coder.

In the video coding processing method provided in the embodiments of this application, after obtaining a coding state parameter and load information of a terminal in a current processing cycle, and a first coding parameter of a first coder used in the current processing cycle, an application may determine a second coding parameter according to the coding state parameter and the load information of the terminal, and determine whether the second coding parameter and the first coding parameter are the same. If yes, the application continues to use the first coder to code frame data in a next processing cycle; and otherwise, determines a first coding efficiency of the first coder in the current processing cycle. After configuring a second coder according to the second coding parameter, and using the second coder to code the frame data in the next processing cycle, the application determines a second coding efficiency of the second coder in the next processing cycle, so that when it is determined that the second coding efficiency less than a first coding efficiency, and a difference greater than a threshold, the application determines a third coding parameter according to a coding state parameter and load information of the terminal in the next processing cycle, and configure the first coder according to the third coding parameter, to code frame images in the second processing cycle adjacent to the next processing cycle. Therefore, the coding parameters and the coders are adjusted according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience. Moreover, the switching processes of the coding parameters or coders are checked according to the coding efficiency before and after the coding parameters are switched, to further improve the video coding flexibility.

As can be learned through the foregoing analysis, after obtaining the coding state parameter and the load information of the terminal in the current processing cycle, and the first coding parameter of the first coder used in the current processing cycle, the application may determine the second coding parameter according to the coding state parameter and the load information of the terminal, so that when it is determined that the second coding parameter and the first coding parameter are different, the second coder is configured according to the second coding parameter, to code the frame data in the next processing cycle. The following specifically describes the obtaining process of the second coder with reference to FIG. 4.

Figure 4:
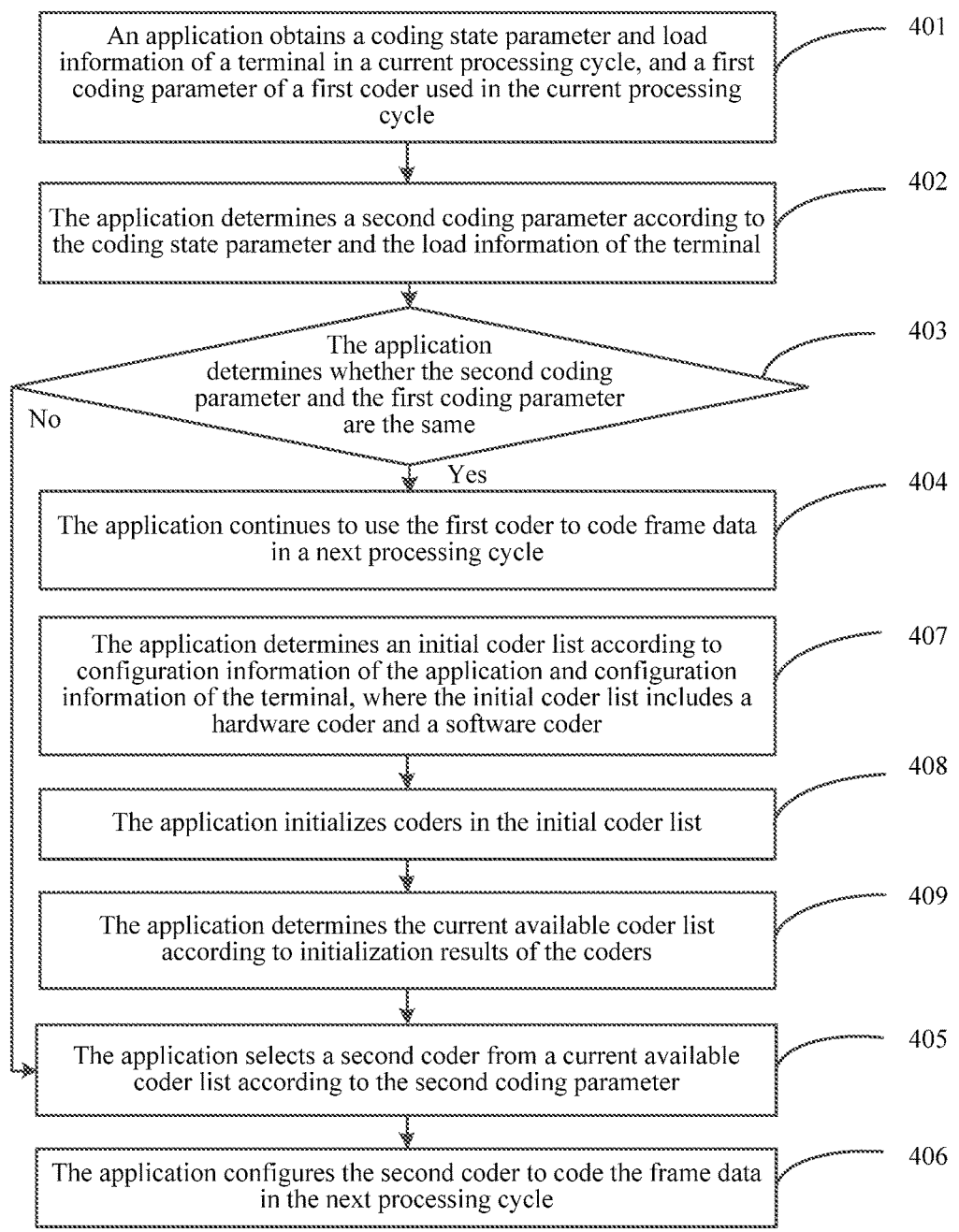
FIG. 4 is a schematic flowchart of a video coding processing method shown according to an exemplary embodiment of this application.

As shown in FIG. 4, the video coding processing method may include the following steps:

Step 401. An application obtains a coding state parameter and load information of a terminal in a current processing cycle, and a first coding parameter of a first coder used in the current processing cycle.

Step 402. The application determines a second coding parameter according to the coding state parameter and the load information of the terminal.

Step 403. The application determines whether the second coding parameter and the first coding parameter are the same, if yes, performs step 404, and otherwise, performs step 405.

Step 404. The application continues to use the first coder to code frame data in a next processing cycle.

For specific implementation processes and principles of step 401 to step 404, reference may be made to specific descriptions in the foregoing embodiments. Details are not described herein again.

Step 405. The application selects a second coder from a current available coder list according to the second coding parameter.

Step 406. The application configures the second coder to code the frame data in the next processing cycle.

The second coder and the first coder belong to different types of coders.

Specifically, a current available coder list may be predetermined, so that after determining the second coding parameter, the application may select the second coder from the current available coder list, and configure the second coder according to the second coding parameter, to code the frame data in the next processing cycle.

During specific implementation, the following method may be used to determine the current available coder list. That is, before step 405, the method may further include:

Step 407. The application determines an initial coder list according to configuration information of the application and configuration information of the terminal, where the initial coder list includes a hardware coder and a software coder.

It may be understood that, a hardware coder is usually configured in the terminal, and a software coder is usually configured in the application. Therefore, the initial coder list including the hardware coder and the software coder may be determined according to the configuration information of the application and the configuration information of the terminal.

Step 408. The application initializes coders in the initial coder list.

Step 409. The application determines the current available coder list according to initialization results of the coders.

It may be understood that, the coders in the initial coder list may be unavailable due to failures or the like. Therefore, in the embodiments of this application, after determining the initial coder, the application may initialize the coders in the initial coder list, to detect system software/hardware environments in the terminal, set the coders correctly, and return initialization results, to further determine the current available coder list according to the initialization results of the coders.

Specifically, after determining the current available coder list, the application may select, according to a coding parameter range suitable for the coders in the available coder list and the second coding parameter, a coder whose coding parameter range includes the second coding parameter from the coders as the second coder, and further configure the second coder according to the second coding parameter, to code the frame data in the next processing cycle.

Further, after the application uses the second coder to code the frame data in the next processing cycle, to obtain a coded bit stream, the application may divide the coded bit stream into N real-time transport protocol (RTP) packets, and performs forward error correction (FEC) coding, to generate M redundant packets. M may be less than or equal to N. Then, the application may add the (M+N) packets with a packet head identifier, and package and transmit a coding stream corresponding to the frame data in the next processing cycle according to the packet head identifier.

That is, after step 406, the method may further include:

The application determines a packet head identifier of an RTP packet corresponding to the frame data in the next processing cycle according to a type of a coder for coding the frame data in the next processing cycle.

The application packages and transmits a coding stream corresponding to the frame data in the next processing cycle according to the packet head identifier.

The packet head identifier is used for uniformly identifying the RTP packet.

Specifically, it may be preset that different coder types correspond to different custom fields, so that after determining the coder for coding the frame data in the next processing cycle, the application may determine a custom field according to the type of the determined coder, use the custom field as the packet head identifier, and package and transmit the coding stream corresponding to the frame data in the next processing cycle.

In addition to the coder type corresponding to the custom field, the packet head identifier may further include sequence number information identifying the packet, such as 0x1, 0x2, and 0x3.

In some embodiments, a correspondence between the sequence number information and the custom field corresponding to the coder type may be shown in Table 1

TABLE 1

| Sequence number | Coder type |
| --- | --- |
| 0x1 | H.264 soft coder |
| 0x2 | H.264 hard coder |
| 0x3 | H.265 soft coder |
| 0x4 | H.265 hard coder |
| 0x5 | VP9 soft coder |
| 0x6 | VP9 hard coder |
| . . . | . . . |

For example, it is assumed that it is preset that when the coder is an H.264 standard-based software coder, the corresponding custom field is "H.264 soft coder"; when the coder is an H.264 standard-based hardware coder, the corresponding custom field is "H.264 hard coder"; when the coder is an H.265 standard-based software coder, the corresponding custom field is "H.265 soft coder"; and when the coder is an H.265 standard-based hardware coder, the corresponding custom field is "H.265 hard coder". When it is determined that the type of the coder for coding the frame data in the next processing cycle is an H.264 standard-based software coder, and the coding stream corresponding to the frame data in the next processing cycle is the first transmitted coding stream, the packet head identifier may be determined as the "0x1 H.264 soft coder", so that the coding stream corresponding to the frame data in the next processing cycle may be packaged and transmitted according to the "0x1 H.264 soft coder".

When the application obtains a video coding instruction, a current available coder may include a plurality of coders. Therefore, the application needs to select a suitable coder from the coders, to code the initial frame data.

Specifically, due to a poor anti packet loss capability of the hardware coder, to reduce a packet loss rate, the application may select a software coder with a strong anti-packet loss capability from the coders according to performance of the coders in the current available coder list, to code the initial frame data.

That is, the video coding processing method provided in the embodiments of this application may further include:

The application selects, in accordance with a determination that a video coding instruction is obtained, a third coder from the available coder list according to performance of the coders in the current available coder list, to code initial frame data, where the third coder is a software coder.

The performance of the coders may include the anti-packet loss capability and the coding efficiency of the coders, whether the coders occupy CPU resources, and the like.

In addition, because when the initial frame data is coded at a high resolution level, the CPU occupation is relatively large, and if the application obtains the video coding instruction, the initial frame data is directly coded at a high resolution level, which may affect system running of the terminal. Therefore, to reduce the CPU occupation when the application in the terminal starts to perform video coding, the application may control a third coder to code the initial frame data at the lowest resolution.

That is, the using the third coder to code the initial frame data may include: The application controls the third coder to code the initial frame data at the lowest resolution.

Before coding the frame data in the processing cycles, the application may further perform preprocessing, such as video format conversion, coding size adjustment, video enhancement processing, or video denoising processing, on the frame data.

In the video coding processing method provided in the embodiments of this application, after obtaining a coding state parameter and load information of a terminal in a current processing cycle, and a first coding parameter of a first coder used in the current processing cycle, an application may determine a second coding parameter according to the coding state parameter and the load information of the terminal, and then determine whether the second coding parameter and the first coding parameter are the same. If yes, the application continues to use the first coder to code frame data in a next processing cycle, and if not, selects a second coder from a current available coder list according to the second coding parameter, and configures the second coder, to code the frame data in the next processing cycle. The coding parameters and the coders are adjusted according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

The following is an apparatus embodiment of this application, which can be used to execute the method embodiments of this application. For details not disclosed in the apparatus embodiment of this application, refer to the method embodiments of this application.

Figure 5:
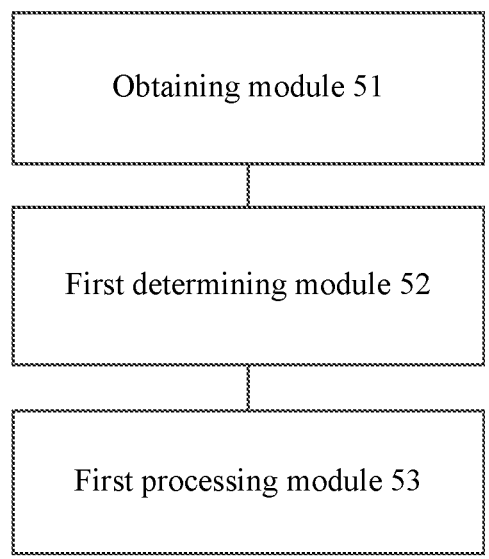
FIG. 5 is a structural block diagram of a video coding processing apparatus shown according to an exemplary embodiment of this application.

FIG. 5 is a schematic structural diagram of a video coding processing apparatus shown according to an exemplary embodiment.

As shown in FIG. 5, the video coding processing apparatus provided in this embodiment of this application may include:

an obtaining module 51, configured to obtain a coding state parameter and load information of a terminal in a current processing cycle, and a first coding parameter of a first coder used in the current processing cycle;

a first determining module 52, configured to determine a second coding parameter according to the coding state parameter and the load information of the terminal; and a first processing module 53, configured to: in accordance with a determination that the second coding parameter and the first coding parameter are different, adjust the first coder according to the second coding parameter, or configure a second coder according to the second coding parameter, to code frame data in a next processing cycle, the second coder and the first coder belonging to different types of coders.

Specifically, the video coding processing apparatus provided in this embodiment of this application may be configured to perform the video coding processing method provided in the embodiments of this application. The apparatus may be configured in any application having a video coding function, to perform video coding processing. The application is disposed in a terminal, and types of the terminal may be plural, for example, may be a mobile phone and a computer.

In a possible implementation form of this embodiment of this application, the apparatus further includes:

a second determining module, configured to determine a first coding efficiency of the first coder in the current processing cycle;

a third determining module, configured to determine a second coding efficiency of the second coder in the next processing cycle;

a fourth determining module, configured to determine a third coding parameter according to a coding state parameter and load information of a terminal in the next processing cycle in accordance with a determination that the second coding efficiency is less than the first coding efficiency, and a difference is greater than a threshold; and a second processing module, configured to configure the first coder according to the third coding parameter, to code frame images in the second processing cycle adjacent to the next processing cycle.

In another possible implementation form of this embodiment of this application, the apparatus further includes:

a fifth determining module, configured to determine that a priority of the first coder is higher than that of the second coder when the coding state parameter and the load information of the terminal are unchanged.

In another possible implementation form of this embodiment of this application, the apparatus further includes:

a sixth determining module, configured to determine, according to the load information of the terminal in the current processing cycle, that a type of a target coder and a type of the first coder used in the current processing cycle are different.

In another possible implementation form of this embodiment of this application, the apparatus further includes:

a seventh determining module, configured to determine the first frame data in the next processing cycle as an intra-prediction frame in accordance with a determination that a coder used in the next processing cycle is the second coder.

In another possible implementation form of this embodiment of this application, the coding state parameter includes: an average packet loss rate, an average PSNR, an average transmission code rate, and an average network bandwidth.

The load information includes a remaining endurance and an average CPU utilization of the terminal.

In another possible implementation form of this embodiment of this application, the apparatus further includes:

a first selection module, configured to select the second coder from a current available coder list according to the second coding parameter.

In another possible implementation form of this embodiment of this application, the apparatus further includes:

an eighth determining module, configured to determine an initial coder list according to configuration information of the application and configuration information of the terminal, where the initial coder list includes a hardware coder and a software coder;

an initialization module, configured to initialize coders in the initial coder list; and a ninth determining module, configured to determine the current available coder list according to initialization results of the coders.

In another possible implementation form of this embodiment of this application, the apparatus further includes:

a second selection module, configured to select, in accordance with a determination that a video coding instruction is obtained, a third coder from the available coder list according to performance of coders in the current available coder list, to code initial frame data, where the third coder is a software coder.

In another possible implementation form of this embodiment of this application, the second selection module is specifically configured to:

control the third coder to code the initial frame data at the lowest resolution.

In another possible implementation form of this embodiment of this application, the apparatus further includes:

a tenth determining module, configured to determine a packet head identifier of an RTP packet corresponding to the frame data in the next processing cycle according to a type of a coder for coding the frame data in the next processing cycle; and a transmission module, configured to package and transmit a coding stream corresponding to the frame data in the next processing cycle according to the packet head identifier.

The foregoing descriptions for the embodiments of the video coding processing method are also applicable to the video coding processing apparatus of the embodiments, which are not described herein again.

In the video coding processing apparatus provided in the embodiments of this application, after obtaining a coding state parameter and load information of a terminal in a current processing cycle, and a first coding parameter of a first coder used in the current processing cycle, an application may determine a second coding parameter according to the coding state parameter and the load information of the terminal, so that when it is determined that the second coding parameter and the first coding parameter are different, the first coder is adjusted according to the second coding parameter, or a second coder is configured according to the second coding parameter, to code frame data in a next processing cycle. The coding parameters and the coders are adjusted according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

In an exemplary embodiment, an application having a video coding function is further provided and includes the foregoing video coding processing apparatus.

In the application having a video coding function provided in the embodiments of this application, after obtaining a coding state parameter and load information of a terminal in a current processing cycle, and a first coding parameter of a first coder used in the current processing cycle, an application may determine a second coding parameter according to the coding state parameter and the load information of the terminal, so that when it is determined that the second coding parameter and the first coding parameter are different, the first coder is adjusted according to the second coding parameter, or a second coder is configured according to the second coding parameter, to code frame data in a next processing cycle. The coding parameters and the coders are adjusted according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

In an exemplary embodiment, a computing device is further provided.

Figure 6:
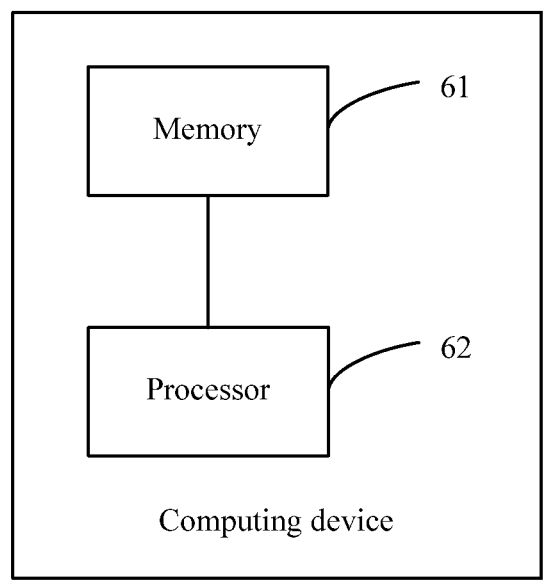
FIG. 6 is a structural block diagram of a computing device shown according to an exemplary embodiment of this application.

FIG. 6 is a structural block diagram of a computing device (a terminal or another physical device that performs computing processing) shown according to an exemplary embodiment.

As shown in FIG. 6, the computing device includes:

a memory 61, a processor 62, and a computer program stored in the memory 61 and capable of being run in the processor 62, when executing the program, the processor 62 implementing the video coding processing method described above.

Specifically, the terminal provided in the embodiments of this application may be a mobile phone, a computer, or the like.

Specifically, the video coding processing method includes:

obtaining a coding state parameter and load information of a terminal in a current processing cycle, and a first coding parameter of a first coder used in the current processing cycle;

determining a second coding parameter according to the coding state parameter and the load information of the terminal; and in accordance with a determination that the second coding parameter and the first coding parameter are different, adjusting the first coder according to the second coding parameter, or configuring a second coder according to the second coding parameter, to code frame data in a next processing cycle, the second coder and the first coder belonging to different types of coders.

The foregoing descriptions for the embodiments of the video coding processing method are also applicable to the terminal of the embodiments, which are not described herein again.

In the terminal provided in embodiments of this application, after obtaining a coding state parameter and load information of a terminal in a current processing cycle, and a first coding parameter of a first coder used in the current processing cycle, an application may determine a second coding parameter according to the coding state parameter and the load information of the terminal, so that when it is determined that the second coding parameter and the first coding parameter are different, the first coder is adjusted according to the second coding parameter, or a second coder is configured according to the second coding parameter, to code frame data in a next processing cycle. The coding parameters and the coders are adjusted according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

In an exemplary embodiment, a computer readable storage medium storing a computer program is further provided, when executed by a processor, the program implementing the video coding processing method described in the foregoing embodiments.

Specifically, the video coding processing method includes:

obtaining a coding state parameter and load information of a terminal in a current processing cycle, and a first coding parameter of a first coder used in the current processing cycle;

determining a second coding parameter according to the coding state parameter and the load information of the terminal; and in accordance with a determination that the second coding parameter and the first coding parameter are different, adjusting the first coder according to the second coding parameter, or configuring a second coder according to the second coding parameter, to code frame data in a next processing cycle, the second coder and the first coder belonging to different types of coders.

The foregoing descriptions for the embodiments of the video coding processing method are also applicable to the computer readable storage medium of the embodiments, which are not described herein again.

The computer readable storage medium provided in the embodiments of this application may be disposed in a device in which video coding can be performed, and the video coding processing method stored in the medium may be performed to adjust the coding parameters and the coders according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

In an exemplary embodiment, a computer program product is further provided, when executed by a processor, instructions in the computer program product performing the video coding processing method described in the foregoing embodiments.

Specifically, the video coding processing method includes:

obtaining a coding state parameter and load information of a terminal in a current processing cycle, and a first coding parameter of a first coder used in the current processing cycle;

determining a second coding parameter according to the coding state parameter and the load information of the terminal; and in accordance with a determination that the second coding parameter and the first coding parameter are different, adjusting the first coder according to the second coding parameter, or configuring a second coder according to the second coding parameter, to code frame data in a next processing cycle, the second coder and the first coder belonging to different types of coders.

The foregoing descriptions for the embodiments of the video coding processing method are also applicable to the computer program product of the embodiments, which are not described herein again.

The computer program product provided in the embodiments of this application may be written into a device in which video coding can be performed, and a program corresponding to the video coding processing method may be performed to adjust the coding parameters and the coders according to network states and the load information, so that when a network packet loss is small and bandwidth is sufficient, a hardware coder is used to code a high resolution video, to improve the video resolution; and when the network packet loss is relatively large, compression coding is performed in a software coding manner, to reduce video lags, improve video coding flexibility, and improve user experience.

In the descriptions of this application, it needs to be understood that, the terms "first" and "second" are only used for describing objectives, but cannot be understood as indicating or implying relative importance or implicitly specifying a quantity of indicated technical features. Therefore, features limited by "first" and "second" may explicitly or implicitly include one or more of the features. In the descriptions of this application, "a plurality of" means two or more, unless clearly and specifically limited otherwise.

In the descriptions of this specification, descriptions of reference terms such as "an embodiment", "some embodiments", "example", "specific example", or "some examples" refer to specific features or characteristics described in combination with the embodiment or example are included in at least one embodiment or example of this application. In this specification, the exemplary expressions for the foregoing terms are unnecessary for the same embodiment or example. Moreover, the described specific features or characteristics may be combined in any one or more of the embodiments or examples. In addition, without any contradiction, a person skilled in the art may combine different embodiments or examples described in this specification and features of the different embodiments or examples.

Any process or method described in the flowcharts or herein in other manners may be understood as representing that one or more of modules, segments, or parts configured to implement code of executable instructions of steps of specific logic functions or processes are included, and the scope of the preferred implementations of this application include other implementations. The functions may be not executed in a shown or discussed sequence including a basically simultaneous manner according to the involved functions or a reverse sequence, which needs to be understood by a person skilled in the art of the embodiments of this application.

The logics and/or steps represented in the flowcharts or described herein in other manners, for example, may be regarded as a sequencing list used for implementing the executable instructions of the logic functions, and may be specifically implemented in any computer readable medium, for an instruction execution system, apparatus, or device (such as a computer-based system, a system including a processor, or another system that may obtain instructions from the instruction execution system, apparatus, or device and execute the instructions) to use, or used in combination with the instruction execute system, apparatus, or device. For this specification, the "computer readable medium" may be any apparatus that may include, store, communicate, spread, or transmit programs for the instruction execution system, apparatus, or device or used in combination with the instruction execution system, apparatus, or device. A more specific example (non-exhaustive list) of the computer readable medium includes the following: an electrical connection parts (electronic apparatus) having one or more wires, a portable computer enclosure (magnetic apparatus), a random access memory (RAM), a read-only memory (ROM), an electrically erasable programmable ROM (EPROM or flash memory), an optical fiber apparatus, and a portable compact disc ROM (CDROM). In addition, the computer readable medium may even be a paper on which the program may be printed or another suitable medium, because the program may be, for example, obtained in an electronic manner by performing optical scanning on the paper or another medium, and next performing editing and interpretation, or performing processing in another suitable manner when necessary, and then stored in a computer memory.

It needs to be understood that, the parts of this application may be implemented by using hardware, software, firmware, or a combination thereof. In the foregoing implementations, a plurality of steps or methods may be implemented by using software or firmware stored in a memory and executed by a suitable instruction execution system. For example, same as that in another implementation, if implemented by using hardware, the steps or methods are implemented by using any one of the following technologies well-known in the art or a combination thereof: a discrete logic circuit having a logic gate circuit configured to implement a logic function on a data signal, an application specific integrated circuit having a suitable combinational logic gate circuit, a programmable gate array (PGA), a field programmable gate array (FPGA), and the like.

A person of ordinary skill in the art may understand that all or some of the steps carried in the methods in the embodiments may be implemented by a computer program instructing relevant hardware. The program may be stored in a computer readable storage medium. When the program is executed, one of the steps or a combination thereof of the methods in the embodiments is included.

In addition, functional units in the embodiments of this application may be integrated in one processing module or exist as separate physical units, or two or more units are integrated in one module. The integrated module may be implemented in a form of hardware, or may be implemented in a form of a software functional module. If implemented in the form of software functional modules and sold or used as an independent product, the integrated modules may also be stored in a computer-readable storage medium.

The aforementioned storage medium may be a ROM, a magnetic disk or an optical disc. Although the embodiments of this application have been shown and described above, it may be understood that, the foregoing embodiments are exemplary, and cannot be understood as a limitation to this application. A person of ordinary skill in the art may make changes, modifications, replacements, and variations to the foregoing embodiment without departing from the scope of this application.

What is claimed is:

1. A video coding processing method, applied to a computing device having one or more processors and memory storing a plurality of programs to be executed by the one or more processors and the method comprising:
   obtaining a coding state parameter and load information in a current processing cycle, and a first coding parameter of a first coder used in the current processing cycle;
   determining a second coding parameter according to the coding state parameter and the load information; and
   in accordance with a determination that the second coding parameter and the first coding parameter are different:
   adjusting the first coder according to the second coding parameter;
   configuring a second coder according to the second coding parameter, to code frame data in a next processing cycle, the second coder and the first coder belonging to different types of coders; and
   determining the frame data in the next processing cycle as an intra-prediction frame in accordance with a determination that a coder used in the next processing cycle is the second coder.

2. The method according to claim 1, further comprising:
   before configuring a second coder according to the second coding parameter, to code frame data in a next processing cycle:
   determining a first coding efficiency of the first coder in the current processing cycle; and
   after coding frame data in a next processing cycle:
   determining a second coding efficiency of the second coder in the next processing cycle;
   determining a third coding parameter according to a coding state parameter and load information in the next processing cycle in accordance with a determination that the second coding efficiency is less than the first coding efficiency, and a difference is greater than a threshold; and
   configuring the first coder according to the third coding parameter, to code frame images in a second processing cycle adjacent to the next processing cycle.

3. The method according to claim 2, further comprising:
   after configuring the first coder according to the third coding parameter:
   determining that a priority of the first coder is higher than that of the second coder in accordance with a determination that the coding state parameter and the load information are unchanged.

4. The method according to claim 1, further comprising:
   before configuring the second coder according to the second coding parameter:
   determining, according to load information of a terminal in the current processing cycle, that a type of a target coder and a type of the first coder used in the current processing cycle are different.

5. The method according to claim 1, wherein the coding state parameter is one selected from the group consisting of an average packet loss rate, an average peak signal to noise ratio (PSNR), an average transmission code rate, and an average network bandwidth; and
   the load information is one selected from the group consisting of a remaining endurance and an average central processing unit (CPU) utilization.

6. The method according to claim 1, further comprising:
   before configuring a second coder, selecting the second coder from a current available coder list according to the second coding parameter.

7. The method according to claim 6, further comprising:
   before selecting the second coder from a current available coder list:
   determining an initial coder list according to configuration information of the computing device, wherein the initial coder list comprises a hardware coder and a software coder;
   initializing coders in the initial coder list; and
   determining the current available coder list according to initialization results of the coders.

8. The method according to claim 6, further comprising:
   selecting, in accordance with a determination that a video coding instruction is obtained, a third coder from the available coder list according to performance of coders in the current available coder list, to code initial frame data, wherein the third coder is a software coder.

9. The method according to claim 8, wherein the coding initial frame data comprises:
   controlling the third coder to code the initial frame data at the lowest resolution.

10. The method according to claim 6, further comprising:
    after coding frame data in a next processing cycle:
    determining a packet head identifier of a real-time transport protocol (RTP) packet corresponding to the frame data in the next processing cycle according to a type of a coder for coding the frame data in the next processing cycle; and
    packaging and transmitting a coding stream corresponding to the frame data in the next processing cycle according to the packet head identifier.

11. A computing device comprising one or more processors, memory coupled to the one or more processors and a plurality of programs stored in the memory that, when executed by the one or more processors, cause the client to perform a plurality of operations comprising:
    obtaining a coding state parameter and load information in a current processing cycle, and a first coding parameter of a first coder used in the current processing cycle;

determining a second coding parameter according to the coding state parameter and the load information; and in accordance with a determination that the second coding parameter and the first coding parameter are different:
adjusting the first coder according to the second coding parameter;
configuring a second coder according to the second coding parameter, to code frame data in a next processing cycle, the second coder and the first coder belonging to different types of coders; and
determining the frame data in the next processing cycle as an intra-prediction frame in accordance with a determination that a coder used in the next processing cycle is the second coder.

12. The computing device according to claim 11, wherein the plurality of operations further comprise:
before configuring a second coder according to the second coding parameter, to code frame data in a next processing cycle:
determining a first coding efficiency of the first coder in the current processing cycle; and
after coding frame data in a next processing cycle:
determining a second coding efficiency of the second coder in the next processing cycle;
determining a third coding parameter according to a coding state parameter and load information in the next processing cycle in accordance with a determination that the second coding efficiency is less than the first coding efficiency, and a difference is greater than a threshold; and
configuring the first coder according to the third coding parameter, to code frame images in a second processing cycle adjacent to the next processing cycle.

13. The computing device according to claim 12, wherein the plurality of operations further comprise:
after configuring the first coder according to the third coding parameter:
determining that a priority of the first coder is higher than that of the second coder in accordance with a determination that the coding state parameter and the load information are unchanged.

14. The computing device according to claim 11, wherein the plurality of operations further comprise:
before configuring the second coder according to the second coding parameter:
determining, according to load information of a terminal in the current processing cycle, that a type of a target coder and a type of the first coder used in the current processing cycle are different.

15. The computing device according to claim 11, wherein the coding state parameter is one selected from the group consisting of an average packet loss rate, an average peak signal to noise ratio (PSNR), an average transmission code rate, and an average network bandwidth; and the load information is one selected from the group consisting of a remaining endurance and an average central processing unit (CPU) utilization.

16. The computing device according to claim 11, wherein the plurality of operations further comprise:
before configuring a second coder, selecting the second coder from a current available coder list according to the second coding parameter.

17. A non-transitory computer readable storage medium storing a plurality of machine readable instructions in connection with a client having one or more processors, wherein the plurality of machine readable instructions, when executed by the one or more processors, cause the client to perform a plurality of operations including:
obtaining a coding state parameter and load information in a current processing cycle, and a first coding parameter of a first coder used in the current processing cycle;
determining a second coding parameter according to the coding state parameter and the load information; and
in accordance with a determination that the second coding parameter and the first coding parameter are different:
adjusting the first coder according to the second coding parameter;
configuring a second coder according to the second coding parameter, to code frame data in a next processing cycle, the second coder and the first coder belonging to different types of coders; and
determining the frame data in the next processing cycle as an intra-prediction frame in accordance with a determination that a coder used in the next processing cycle is the second coder.

18. The non-transitory computer readable storage medium according to claim 17, wherein the plurality of operations further comprise:
before configuring a second coder according to the second coding parameter, to code frame data in a next processing cycle:
determining a first coding efficiency of the first coder in the current processing cycle; and
after coding frame data in a next processing cycle:
determining a second coding efficiency of the second coder in the next processing cycle;
determining a third coding parameter according to a coding state parameter and load information in the next processing cycle in accordance with a determination that the second coding efficiency is less than the first coding efficiency, and a difference is greater than a threshold; and
configuring the first coder according to the third coding parameter, to code frame images in a second processing cycle adjacent to the next processing cycle.

* * * * *